United States Patent
Tarantini et al.

(10) Patent No.: US 8,571,769 B2
(45) Date of Patent: Oct. 29, 2013

(54) CONTROL METHOD OF THE POSITION OF A SOLENOID VALVE USING DITHERING

(75) Inventors: Alfonso Tarantini, Monza (IT); Bruno Imperioli, Castel Maggiore (IT); Luca Poggio, Casalecchio di Reno (IT)

(73) Assignee: Ferrari S.p.A. (IT)

( * ) Notice: Subject to any disclaimer, the term of this patent is extended or adjusted under 35 U.S.C. 154(b) by 276 days.

(21) Appl. No.: 13/043,321

(22) Filed: Mar. 8, 2011

(65) Prior Publication Data

US 2011/0246035 A1 Oct. 6, 2011

(30) Foreign Application Priority Data

Mar. 9, 2010 (IT) .................................. BO10A0140

(51) Int. Cl.
G06F 17/10 (2006.01)
F16K 31/02 (2006.01)

(52) U.S. Cl.
CPC ................. *G06F 17/10* (2013.01); *F16K 31/02* (2013.01)
USPC ............ 701/51; 701/55; 701/58; 251/129.01; 251/129.15

(58) Field of Classification Search
USPC .............. 701/51, 52, 55, 58, 60, 66; 700/282; 137/14, 487.5; 192/58.2; 251/129.01, 251/129.08, 129.15; 303/20; 361/152
See application file for complete search history.

(56) References Cited

U.S. PATENT DOCUMENTS

| | | | |
|---|---|---|---|
| 7,192,005 B2 * | 3/2007 | Denyer et al. ............ | 251/129.08 |
| 7,853,360 B2 | 12/2010 | Kissler et al. | |
| 2006/0011878 A1 | 1/2006 | Denyer et al. | |
| 2009/0005913 A1 * | 1/2009 | Fernandez et al. ............... | 701/51 |
| 2009/0206292 A1 * | 8/2009 | Popp et al. ................ | 251/129.15 |
| 2009/0225489 A1 * | 9/2009 | Lehner et al. .................. | 361/152 |

FOREIGN PATENT DOCUMENTS

| | | |
|---|---|---|
| JP | 10-198431 A | 7/1998 |
| JP | 2009-228794 A | 10/2009 |
| WO | WO-2006/037715 A1 | 4/2006 |

OTHER PUBLICATIONS

"Italian Application Serial No. IT B020100140, Search Report dated Nov. 5, 2010", 2 pgs.

* cited by examiner

*Primary Examiner* — Thomas Black
*Assistant Examiner* — Dale W Hilgendorf
(74) *Attorney, Agent, or Firm* — Schwegman Lundberg & Woessner, P.A.

(57) ABSTRACT

The present subject matter includes a control method to position a solenoid valve using dithering. The control method provides the steps of: determining a target current across the solenoid valve which is expressed in digital form with a given minimum quantization interval, adding a dithering square wave to the target current, controlling the voltage applied to the solenoid valve to cause the current across the solenoid valve to track the target current added to the dithering square wave, jiggling the dithering square wave with a frequency which is a sub-multiple with respect to the maximum variation frequency of the current across the solenoid valve, and varying the amplitude of the dithering square wave.

19 Claims, 13 Drawing Sheets

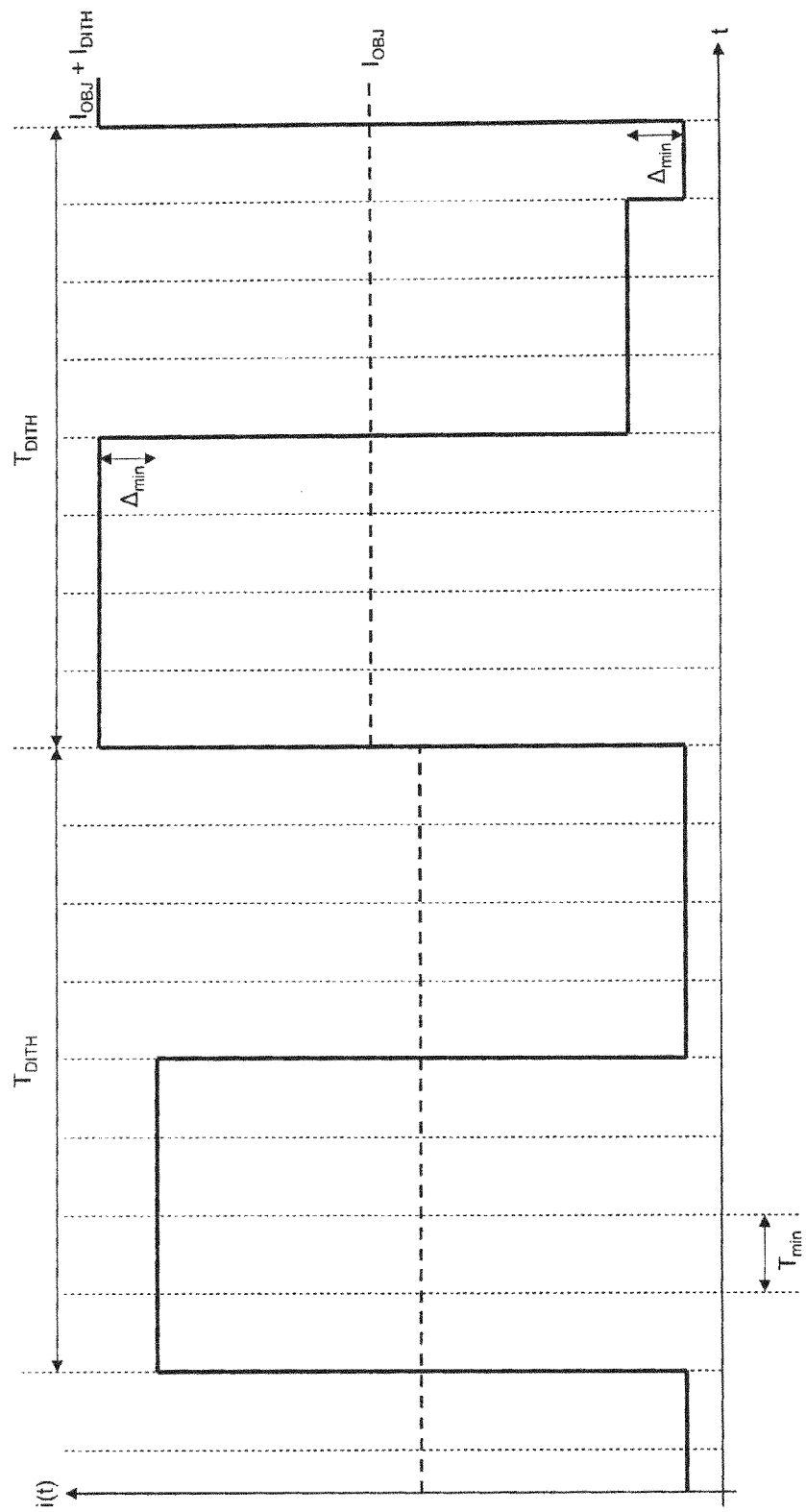

CONTROL METHOD OF THE POSITION OF A SOLENOID VALVE USING DITHERING

RELATED APPLICATION

This application claims the benefit of priority under 35 U.S.C. Section 119 to Italian Patent Application Serial No. B02010A 000140, filed on Mar. 9, 2010, which is incorporated herein by reference in its entirety.

TECHNICAL FIELD

The present document relates to a method to control the position of a solenoid valve using dithering. Some examples reference control of a solenoid valve of a driving hydraulic circuit for an automatic manual transmission which will be explicitly referred to in the following discussion without however losing in generality.

BACKGROUND

Automatic manual transmissions (commonly referred to as "AMT") are increasing in popularity. A typical AMT is structurally similar to a traditional type manual gearbox, except that the clutch pedal and the gear selector lever typically operated by the user are instead operated by corresponding hydraulic servo-controls controlled by solenoid valves.

SUMMARY

In some examples, an automatic manual transmission is provided with a transmission control unit which drives hydraulic servo-controls associated with one or both of a clutch and gearbox to disengage the current gear and engage the next gear, during a gear change. According to some examples, the transmission control unit comprises a main microcontroller that communicates with sensors and the other components of the vehicle (essentially, an engine control unit), thus defining a target position for each hydraulic servo-control and therefore translating such target position into a target current for the corresponding solenoid valve. In order to relieve the main microcontroller from the intensive task of directly implementing the current control of the solenoid valves, the main microcontroller does not directly implement the current control of each solenoid valve, yet communicates the target current to a corresponding supporting microcontroller which autonomously achieves the current control of the solenoid valve for tracking the target current received from the main microcontroller.

Typically, the main microcontroller uses the current control using dithering, i.e. the main microcontroller overlaps a dithering square wave, which has a zero mean value and has a high oscillation frequency, to the target current determined according to the target position; the period of the dithering square wave is too small to disturb the hydraulic system driven by the solenoid valve, but it allows to inhibit the occurrence of static friction phenomena within the solenoid valve. In other words, the solenoid valve is kept "in fibrillation" with minor fast and small scale oscillations around the target position for preventing the moving parts of the solenoid valve from "sticking" by increasing the breakout static friction.

Each supporting microcontroller comprises a digital input which is connected to the main microcontroller for receiving the target current to be tracked from the main microcontroller itself. The target current to be tracked (i.e. the desired value of current moment by moment) is provided by the main microcontroller as a fraction of the maximum value and has a resolution defined by the number of bits of the digital input; for example, an 8-bit digital input allows a resolution of $\frac{1}{256}$, a 9-bit digital input allows a resolution of $\frac{1}{512}$, and a 10-bit digital input allows a resolution of $\frac{1}{1024}$.

Specifically, the control of the solenoid valve which drives the clutch requires a high accuracy, since the hydraulic servo-control of the clutch must on one hand be able to develop a very high thrust for transmitting a high torque through the clutch (especially in the case of a clutch in oil bath), and on the other hand it must be able to accurately make small movements by exerting a moderate thrust when the clutch plates start to interact with each other (i.e. in the first moments of closing of the clutch).

It may happen that the digital input resolution of the supporting microcontrollers is insufficient as compared with the accuracy to be achieved in the current control of the solenoid valves, i.e. when it is desired to have a more accurate current control of the solenoid valves than it is allowed by the digital input resolution of the supporting microcontroller. Currently, such situation is remedied only by replacing the existing supporting microcontrollers with higher performance supporting microcontrollers; however, such replacement is relatively cost-effective when it is possible to take action during the designing step of the transmission control unit, but it is extremely expensive (especially in the presence of small volumes) when an already marketed transmission control unit is to be modified.

To address at least some of these design aspects, some examples of the present subject matter provide a method to control the position of a solenoid valve using dithering. Certain control method examples are free of one or more of the above-described drawbacks and are easy and/or cost-effective to implement.

Examples provide a method to control the position of a solenoid valve using dithering as claimed in the attached claims.

BRIEF DESCRIPTION OF THE DRAWINGS

The present invention will now be described with reference to the attached drawings, which show a non-limitative embodiment thereof, in which:

FIGS. 4-13 are ten graphs showing corresponding time trends of an electric current flowing across the solenoid valve in FIG. 3.

DETAILED DESCRIPTION

Figure 1:
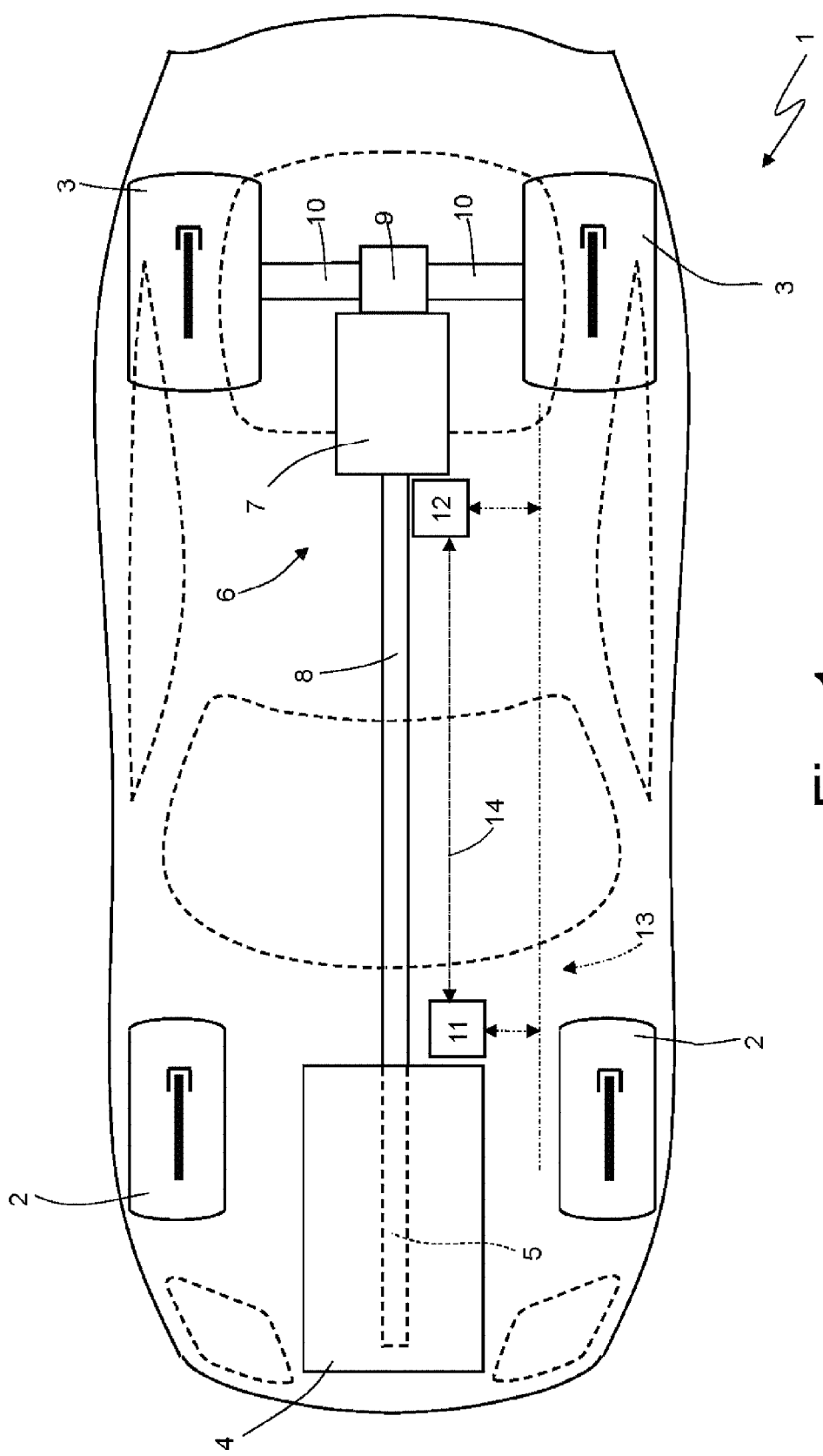
FIG. 1 is a schematic and plan view of a rear-wheel drive vehicle provided with an automatic manual transmission.

In FIG. 1, numeral 1 indicates as a whole a vehicle (specifically a car) provided with two front wheels 2 and two rear drive wheels 3; in front position there is arranged an internal combustion engine 4 which is provided with a crankshaft 5 and produces a driving torque which is transmitted to the rear drive wheels 3 by means of an automatic manual transmission 6. The transmission 6 comprises a dual-clutch gearbox 7 arranged at the rear and a drive shaft 8 which connects the crankshaft 5 to an input of the gearbox 7. A self-locking differential 9, from which originates a pair of axle shafts 10, each of which is integral with a rear drive wheel 3, is connected in cascade to the gearbox 7.

Vehicle 1 comprises a control unit 11 of the engine which supervises the control of the engine 4, a transmission control unit 12 which supervises the control of the transmission 6, and a BUS line 13 made according to the CAN (Car Area Network) protocol which is extended to the entire vehicle 1 and allows the control units 11 and 12 to communicate with each other. In other words, the control unit 11 of the engine 4 and the transmission control unit 12 are connected to the BUS line 13 and therefore can communicate with each other by means of messages sent over the BUS line 13 itself. Furthermore, the control unit 11 of the engine 4 and the transmission control unit 12 can be directly connected to each other by means of a dedicated synchronization cable 14 which is able to directly transmit a signal from the transmission control unit 12 to the control unit 11 of the engine 4 without the delays introduced by the BUS line 13.

Figure 2:
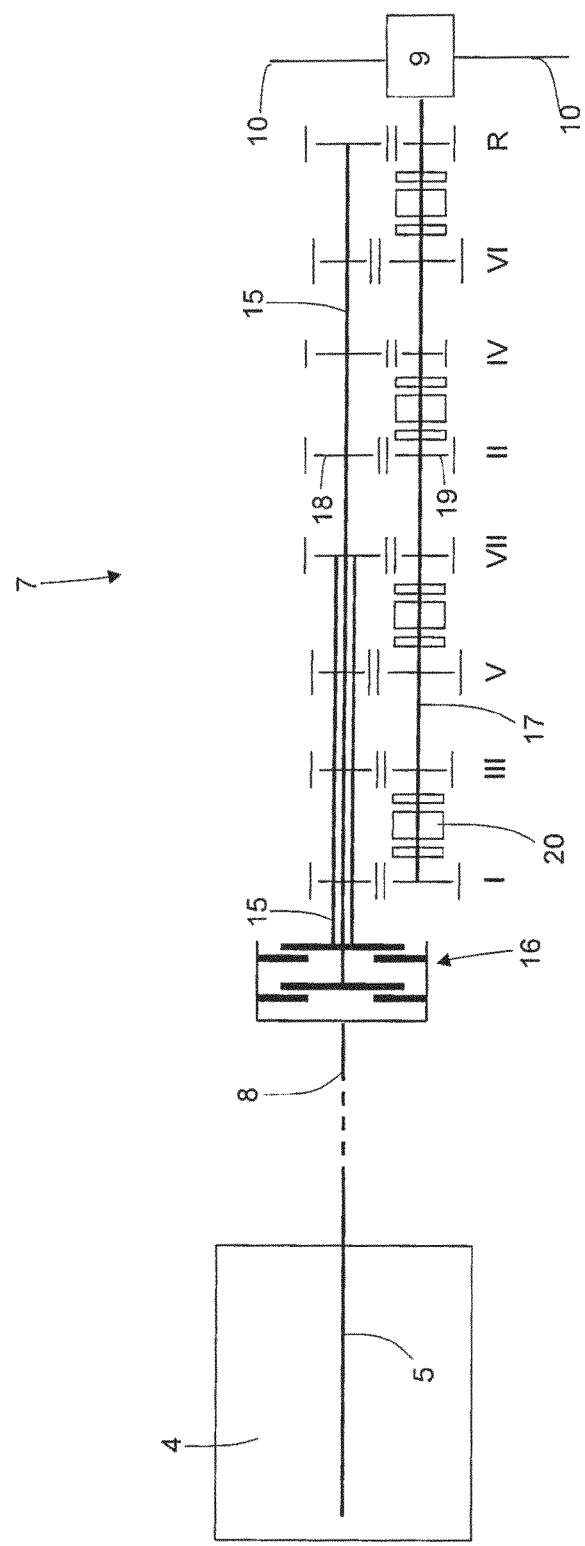
FIG. 2 is a schematic view of the automatic manual transmission of the vehicle in FIG. 1.

As shown in FIG. 2, the dual-clutch gearbox 7 comprises a pair of primary shafts 15 which are coaxial with each other, independent and fitted within each other. Furthermore, the dual-clutch gearbox 7 comprises two coaxial clutches 16 arranged in series, each of which is adapted to connect a corresponding primary shaft 15 to the crankshaft 5 of the internal combustion engine 4 by means of the interposition of the transmission shaft 8. The dual-clutch gearbox 7 comprises a single secondary shaft 17 connected to the differential 9 which transmits the motion to the rear drive wheels 3; according to an alternative and equivalent embodiment, the dual-clutch gearbox 7 comprises two secondary shafts 17 which are both connected to the differential 9.

The dual-clutch gearbox 7 has seven forward gears indicated by Roman numerals (first gear I, second gear II, third gear III, fourth gear IV, fifth gear V, sixth gear VI and seventh gear VII) and a reverse gear (indicated by the letter R). The primary shaft 15 and the secondary shaft 17 are mechanically coupled with each other by means of a plurality of pairs of gears, each of which defines a corresponding gear and comprises a primary gear 18 fitted on the primary shaft 15 and a secondary gear 19 fitted on the secondary shaft 17. In order to allow a proper operation of the dual-clutch gearbox 7, all the odd gears (first gear I, third gear III, fifth gear V, seventh gear VII) are coupled to the same primary shaft 15, while all the even gears (second gear II, fourth gear IV and sixth gear VI) are coupled to the other primary shaft 15.

Each primary gear 18 is keyed to a corresponding primary shaft 15 for always rotating integrally with the primary shaft 15 itself and permanently meshes with the corresponding secondary gear 19; on the contrary, each secondary gear 19 is idly fitted on the secondary shaft 17. Furthermore, the dual-clutch gearbox 7 comprises four double synchronizers 20, each of which is coaxially fitted to the secondary shaft 17, it is arranged between two secondary gears 19, and is adapted to be actuated for alternatively engaging the two corresponding secondary gears 19 with the secondary shaft 17 (i.e. for alternatively making the two corresponding secondary gears 19 angularly integral with the secondary shaft 17). In other words, each synchronizer 20 may be moved in a direction for engaging a secondary gear 19 with the secondary shaft 17, or it may be moved in the opposite direction for engaging the other secondary gear 19 with the secondary shaft 17.

Figure 3:
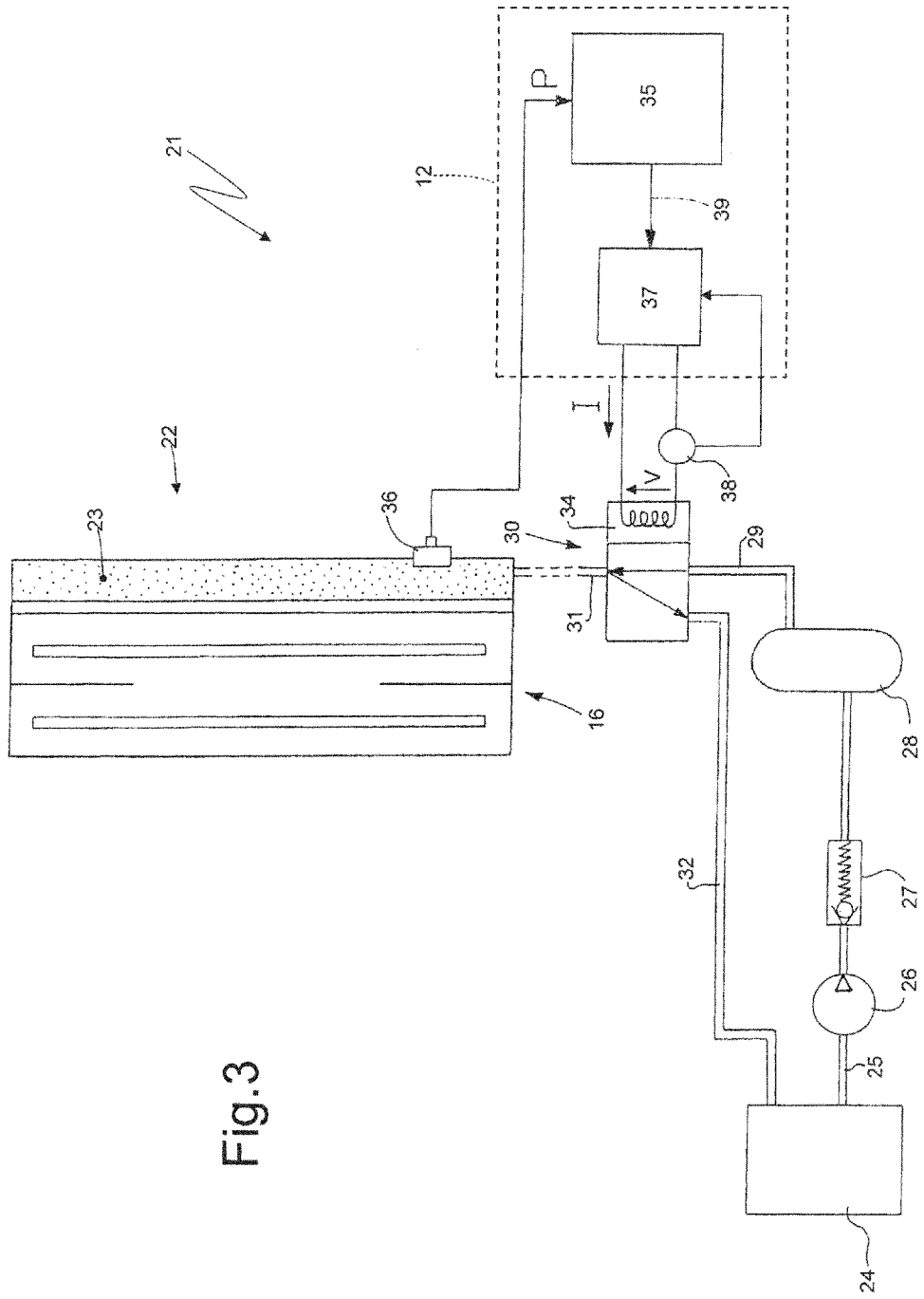
FIG. 3 is a schematic view of a driving hydraulic circuit of a clutch of the automatic manual transmission in FIG. 2 provided with a solenoid valve which is controlled according to the control method of some examples.

As shown in FIG. 3, the transmission 6 comprises a driving hydraulic circuit 21 (only partially shown in FIG. 3) which actuates the clutches 16 and the synchronizers 20 by means of respective hydraulic servo-controls 22 (only one of which is shown in FIG. 3). Specifically, for the sake of simplicity, FIG. 3 shows a single hydraulic servo-control 22 which is coupled to a clutch 16 and is provided with a thrust chamber 23 which may be filled with oil under pressure; when the thrust chamber 23 is filled with oil under pressure, an axial thrust on the plates of the clutch 16 is generated with an intensity essentially proportional to the pressure P of the oil within the thrust chamber 23.

The hydraulic circuit 21 comprises a reservoir 24 for oil at atmospheric pressure, from which originates a conduit 25 provided with a pump 26 and a check valve 27 for feeding oil under pressure to a hydraulic accumulator 28; the hydraulic accumulator 28 communicates by means of a conduit 29 with an inlet of a proportional solenoid valve 30, from which originate a conduit 31 flowing to the thrust chamber 23 and a conduit 32 flowing to the reservoir 24. In use, the solenoid valve 30 is able to keep the thrust chamber 23 isolated from the reservoir 24 for keeping the pressure P of the oil in the thrust chamber 23 constant, it is able to connect the thrust chamber 23 to the reservoir 24 for reducing the pressure P of the oil in the thrust chamber 23, and is adapted to connect the thrust chamber 23 to the hydraulic accumulator 28 for increasing the pressure P of the oil in the thrust chamber 23.

The solenoid valve 30 is provided with a control coil 34 which is crossed by an electric current I generated by the transmission control unit 12 by applying a voltage V variable over time to the ends of the control coil 34. The transmission control unit 12 comprises a main microcontroller 35 which communicates with the sensors of the transmission 6 (such as for example a pressure sensor 36 which measures the pressure P of the oil within the thrust chamber 23) and with the other components of vehicle 1 (essentially with the engine control unit 11), thus defining a target position for each hydraulic servo-control 22 and therefore translating such target position to a corresponding target current $I_{OBJ}$ (shown in FIGS. 4-13) for the corresponding solenoid valve 30. In order to relieve the main microcontroller 35 from the intensive task of directly implementing the current control of the solenoid valves 30, the main microcontroller 35 does not directly implement the current control of each solenoid valve 30, yet communicates the target current $I_{OBJ}$ to a corresponding supporting microcontroller 37 which autonomously achieves the current control of the solenoid valve 30 for tracking the target current $I_{OBJ}$ received from the main microcontroller 35. In particular, each supporting microcontroller 37 tracks the target current $I_{OBJ}$ received from the main microcontroller 35 by means of a feedback control and is therefore provided with a current sensor 38 which measures the intensity of the electric current I which crosses the control coil 34 of the solenoid valve 30.

Each supporting microcontroller 37 comprises a digital input 39 which is connected to the main microcontroller 35 for receiving the target current $I_{OBJ}$ to be tracked from the main microcontroller 35 itself. The target current $I_{OBJ}$ to be tracked (i.e. the desired value moment by moment of the current I which crosses the control coil 34 of the solenoid valve 30) is provided by the main microcontroller 35 as a fraction of the maximum value and has a resolution defined by the number of bits of the digital input 39; for example, an 8-bit digital input 39 allows a resolution of $1/256$, a 9-bit digital input 39 allows a resolution of $1/512$, and a 10-bit digital input 39 allows a resolution of $1/1024$. Consequently, the resolution of the digital input 39 (i.e. the number of bits of the digital input 39) defines the minimum quantization interval $\Delta_{min}$ of the target current $I_{OBJ}$ (shown in FIGS. 6-13); in other words, the higher the resolution of the digital input 39 (i.e. the greater the number of bits of the digital input 39), the smaller the minimum quantization interval $\Delta_{min}$ of the target current $I_{OBJ}$. For example, an 8-bit digital input 39 allows a resolution of $1/256$ and therefore the minimum variation of the target current $I_{OBJ}$ is 1/256 (i.e. it is not possible to increase or decrease the target current $I_{OBJ}$ by a quantity smaller than 1/256).

Figure 4:
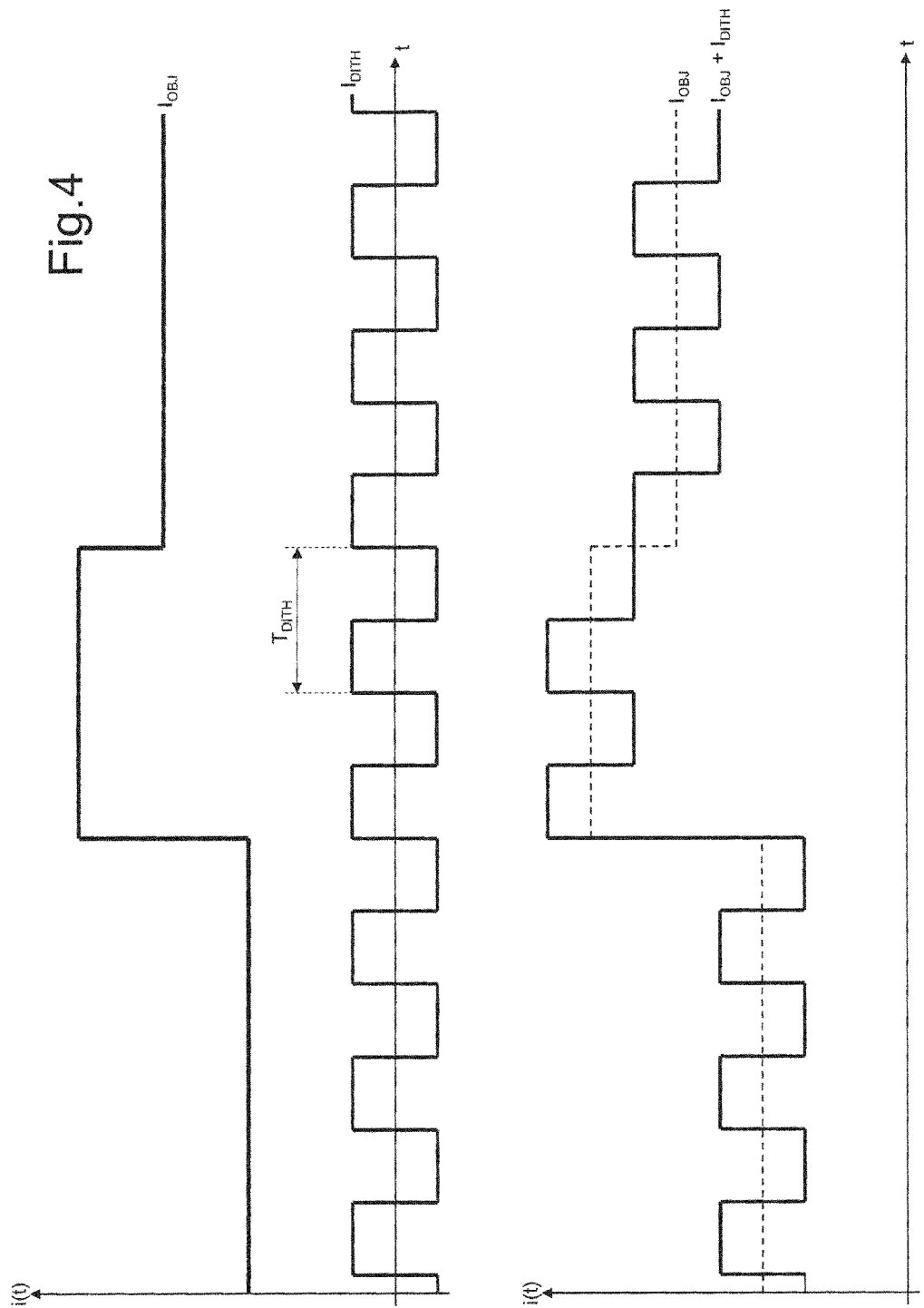
Figure 5:
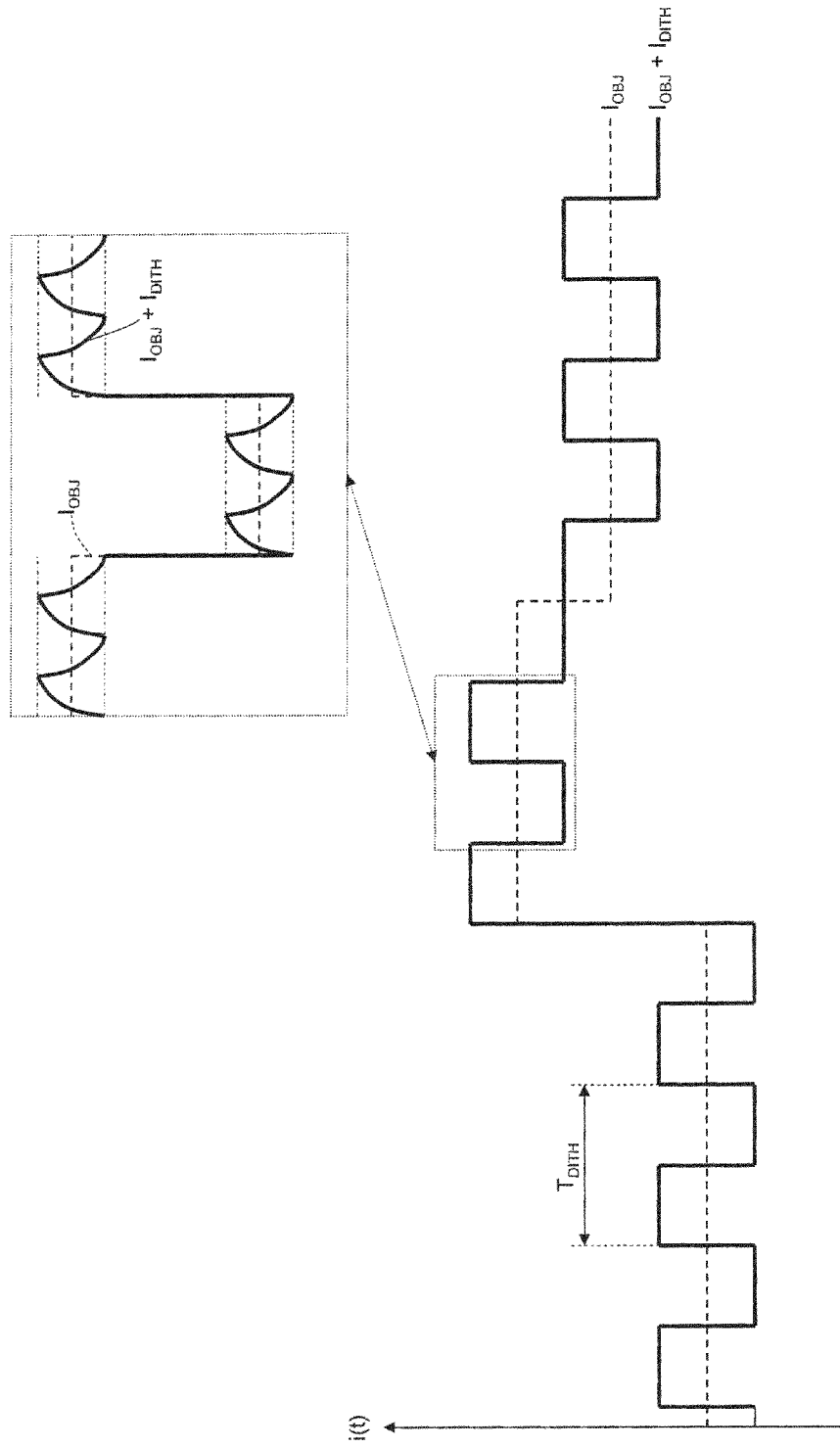

As shown in FIG. 4, the main microcontroller 35 uses the control current using dithering, i.e. the main microcontroller 35 overlaps a dithering square wave $I_{DITH}$, which normally (i.e. under normal conditions) has a zero mean value and has a high oscillation frequency, to each target current $I_{OBJ}$ determined according to the target position; the period $T_{DITH}$ of the dithering square wave is too small to disturb the hydraulic circuit 21 driven by the solenoid valves 30, but allows to inhibit the occurrence of static friction phenomena within the solenoid valves 30. In other words, each solenoid valve 30 is kept "in fibrillation" with minor fast and small scale oscillations around the target position for preventing the moving parts of the solenoid valve 30 from "sticking" by increasing the breakout static friction.

As shown in FIG. 4, the main microcontroller 35 determines the target current $I_{OBJ}$, it determines the dithering square wave $I_{DITH}$ which normally has a zero mean value, and adds the dithering square wave $I_{DITH}$ to the target current $I_{OBJ}$, for each solenoid valve 30; the main microcontroller 35 communicates the addition of the target current $I_{OBJ}$ and the dithering wave square $I_{DITH}$ to the digital input 39 of the corresponding supporting microcontroller 37, such that the supporting microcontroller 37 drives the coil 34 of the solenoid valve 30 to track such addition. As apparent from FIG. 5, the supporting microcontroller 37 drives the coil 34 of the solenoid valve 30 by means of the known control technique called "chopper" which provides the application, to the terminals of the coil 34 of the solenoid valve 30, of a positive voltage which determines an increase of the current I which crosses the coil 34 and alternatively of a zero (or negative) voltage which determines a decrease of the current I which crosses the coil 34.

The oscillation frequency of the dithering square wave $I_{DITH}$ is chosen such that this oscillation frequency is an integer sub-multiple of (i.e. is smaller than) the maximum variation frequency of the current I across the solenoid valve 30 (i.e. the maximum "speed" by which it is possible to modify the current I across the solenoid valve 30); in other words, the period $T_{DITH}$ of the dithering square wave $I_{DITH}$ is an integer multiple of (i.e. is higher than) the minimum period $T_{min}$ by which it is possible to modify the current I across the solenoid valve 30, as clearly shown in FIGS. 6-13. In this manner, during a single period $T_{DITH}$ of the dithering square wave $I_{DITH}$, it is possible to vary the intensity of the current I across the solenoid valve 30 for multiple times; in the example shown in FIGS. 6-13, the period $T_{DITH}$ of the dithering square wave $I_{DITH}$ is equal to eight times the minimum period $T_{min}$ by which it is possible to modify the current I across the solenoid valve 30 (i.e. the oscillation frequency of the dithering square wave $I_{DITH}$ is equal to 1/8 of the maximum variation frequency of the current I across the solenoid valve 30) and therefore it is possible to vary the current I across the solenoid valve 30 for eight times at every period $T_{DITH}$ of the dithering square wave $I_{DITH}$.

Due to the fact that during a single period $T_{DITH}$ of the dithering square wave $I_{DITH}$ it is possible to vary the intensity of the current I across the solenoid valve 30 for multiple times, it is possible to vary the amplitude of the dithering square wave $I_{DITH}$ for a fraction of the period $T_{DITH}$ of the dithering square wave $I_{DITH}$ itself and by an amount equal to the minimum quantization interval $\Delta_{min}$ of the target current $I_{OBJ}$ for temporarily determining a deviation of the mean value of the dithering square wave $I_{DITH}$ with respect to zero and therefore obtaining a corresponding variation of the mean value of the target current $I_{OBJ}$ by an amount equal to a fraction of the minimum quantization interval $\Delta_{min}$.

Figure 6:
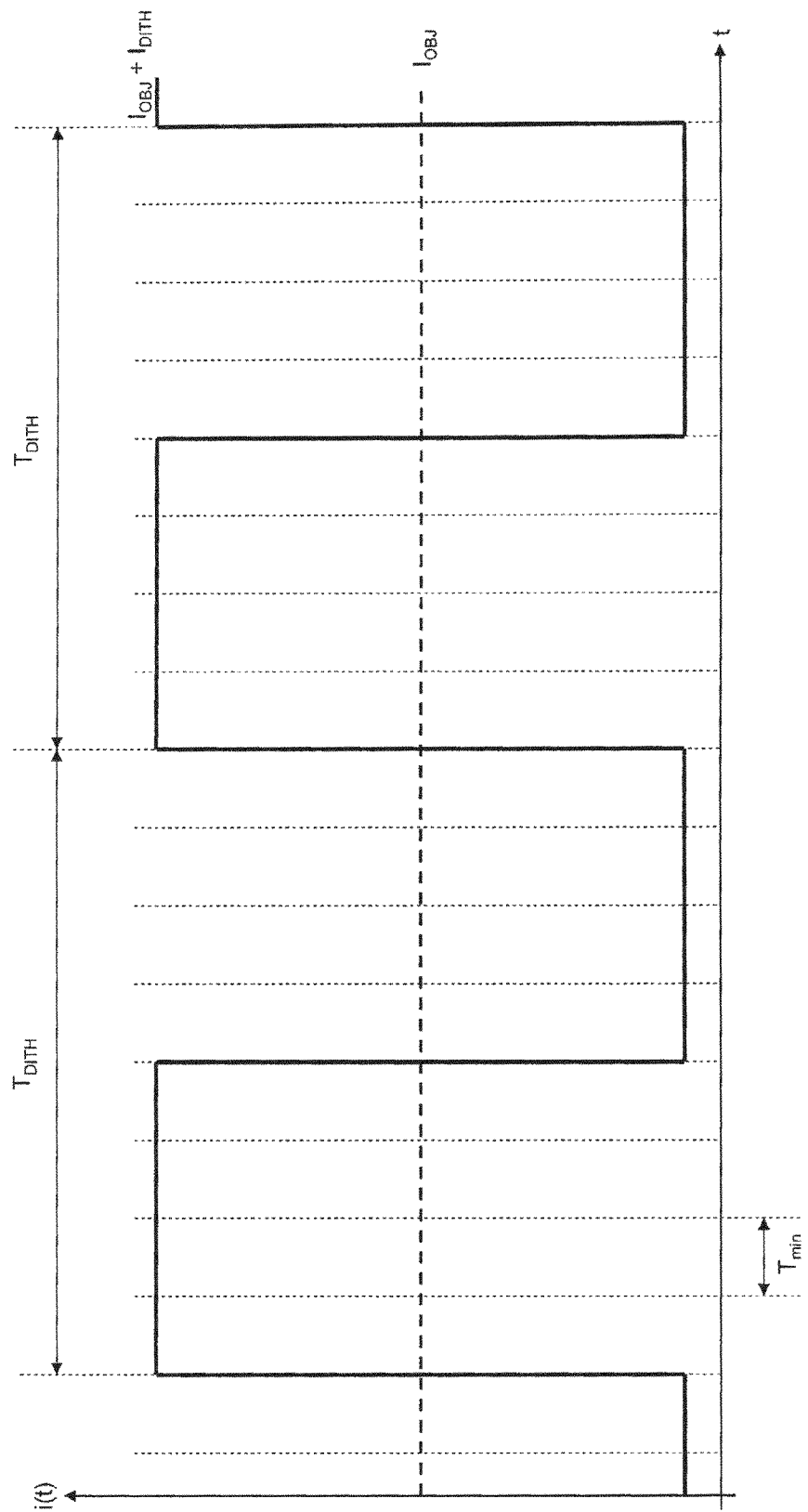

In FIG. 6, the dithering square wave $I_{DITH}$ of the first period is identical to the dithering square wave $I_{DITH}$ of the second period, and therefore the mean value of the target current $I_{OBJ}$ remains constant between the first period and the second period.

Figure 7:
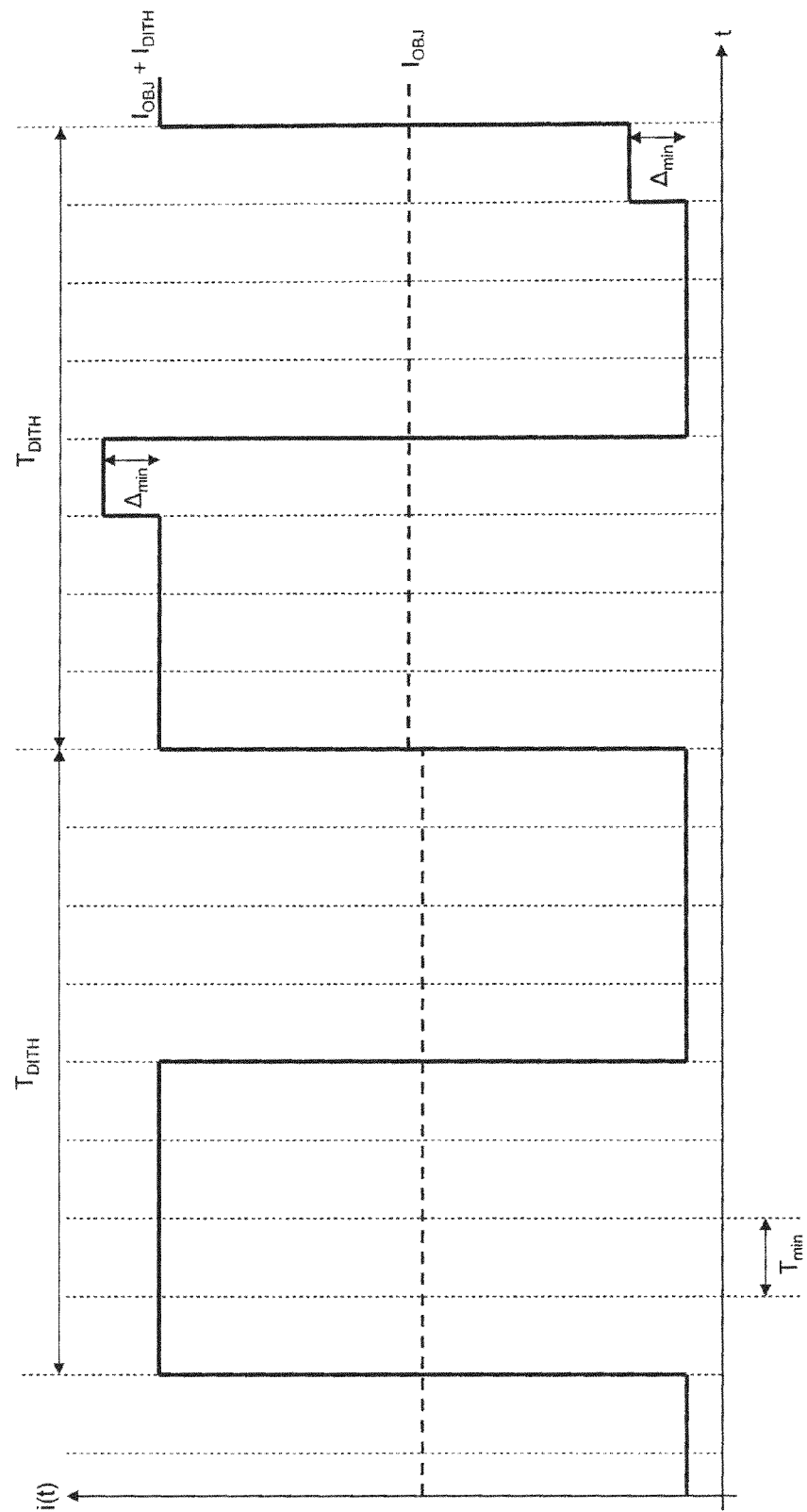
Figure 8:
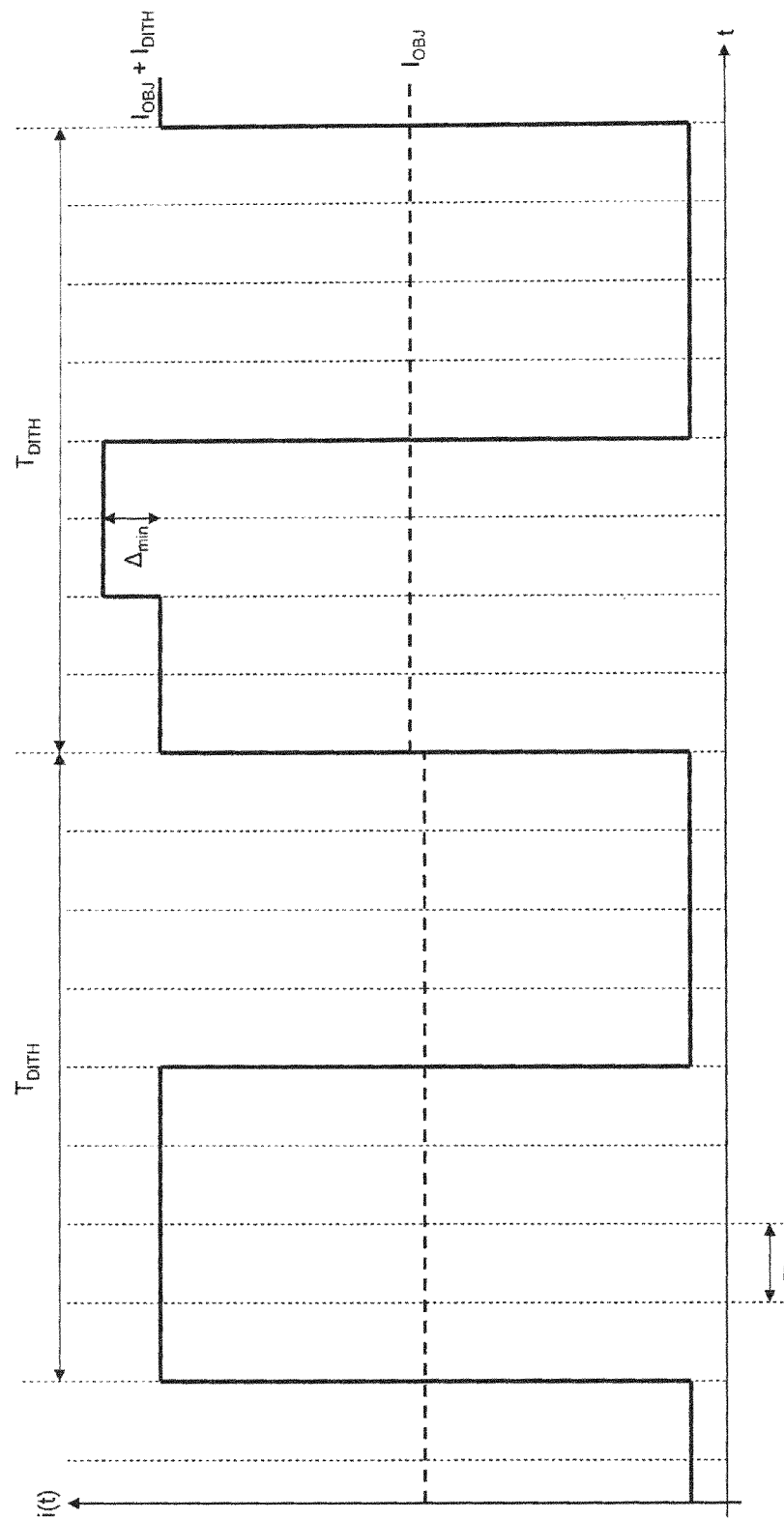
Figure 9:
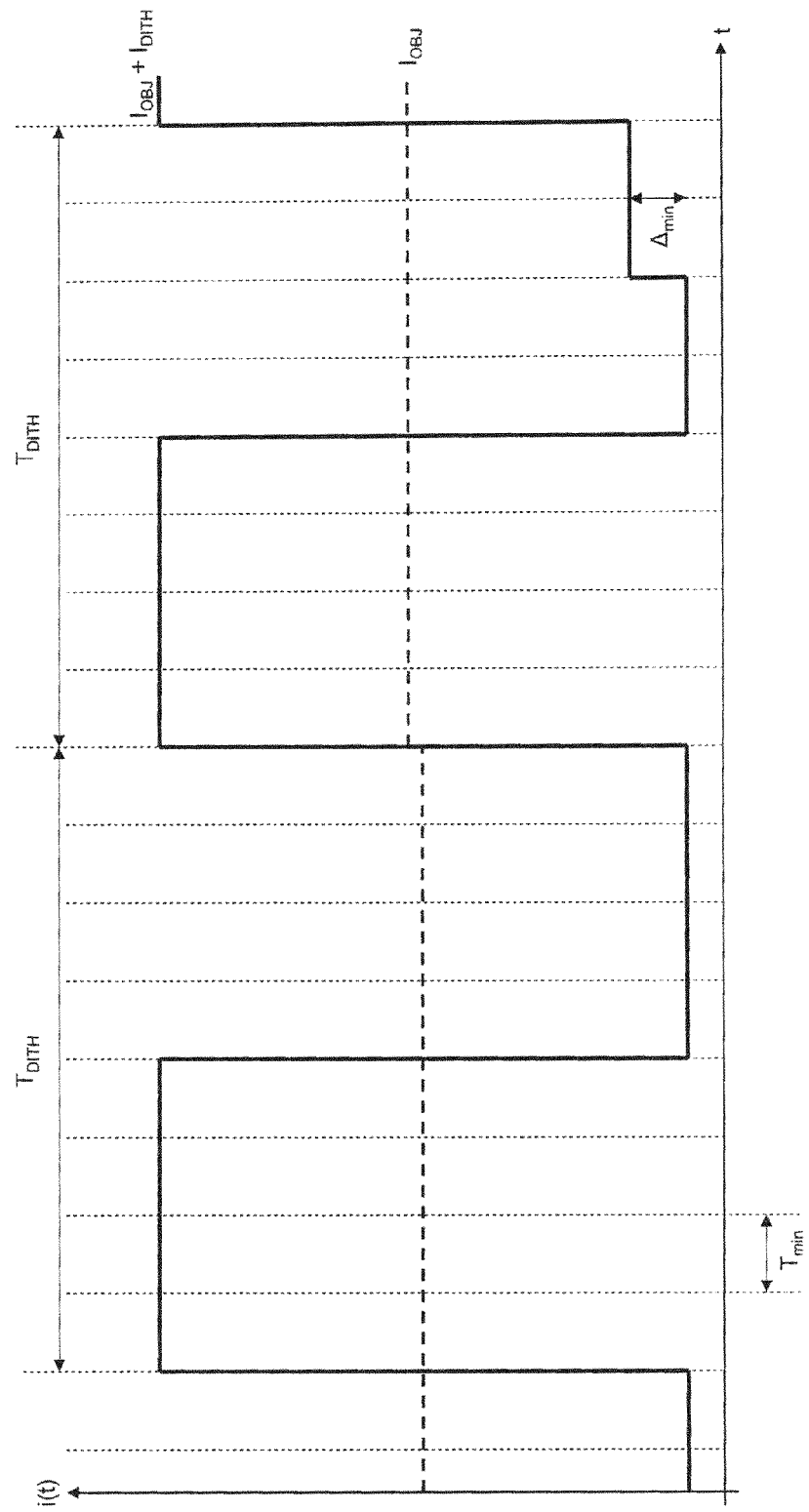

In FIG. 7, the dithering square wave $I_{DITH}$ of the second period differs from the dithering square wave $I_{DITH}$ of the first period in that, during 1/4 of the period $T_{DITH}$, the dithering square wave $I_{DITH}$ of the second period is increased by an amount equal to the minimum quantization interval $\Delta_{min}$ for 1/4 of the period $T_{DITH}$; in this manner, the mean value of the target current $I_{OBJ}$ increases by 1/4 of the minimum quantization interval $\Delta_{min}$ between the first period and the second period. As shown in FIG. 7, the increase of the dithering square wave $I_{DITH}$ of the second period is distributed half in a first positive half period and half in a second negative period; as shown in FIGS. 8 and 9, it is also possible to set all the increase of the dithering square wave $I_{DITH}$ of the second period in a single half period (in the first half period as shown in FIG. 8 and in the second half period as shown in FIG. 9).

Figure 10:
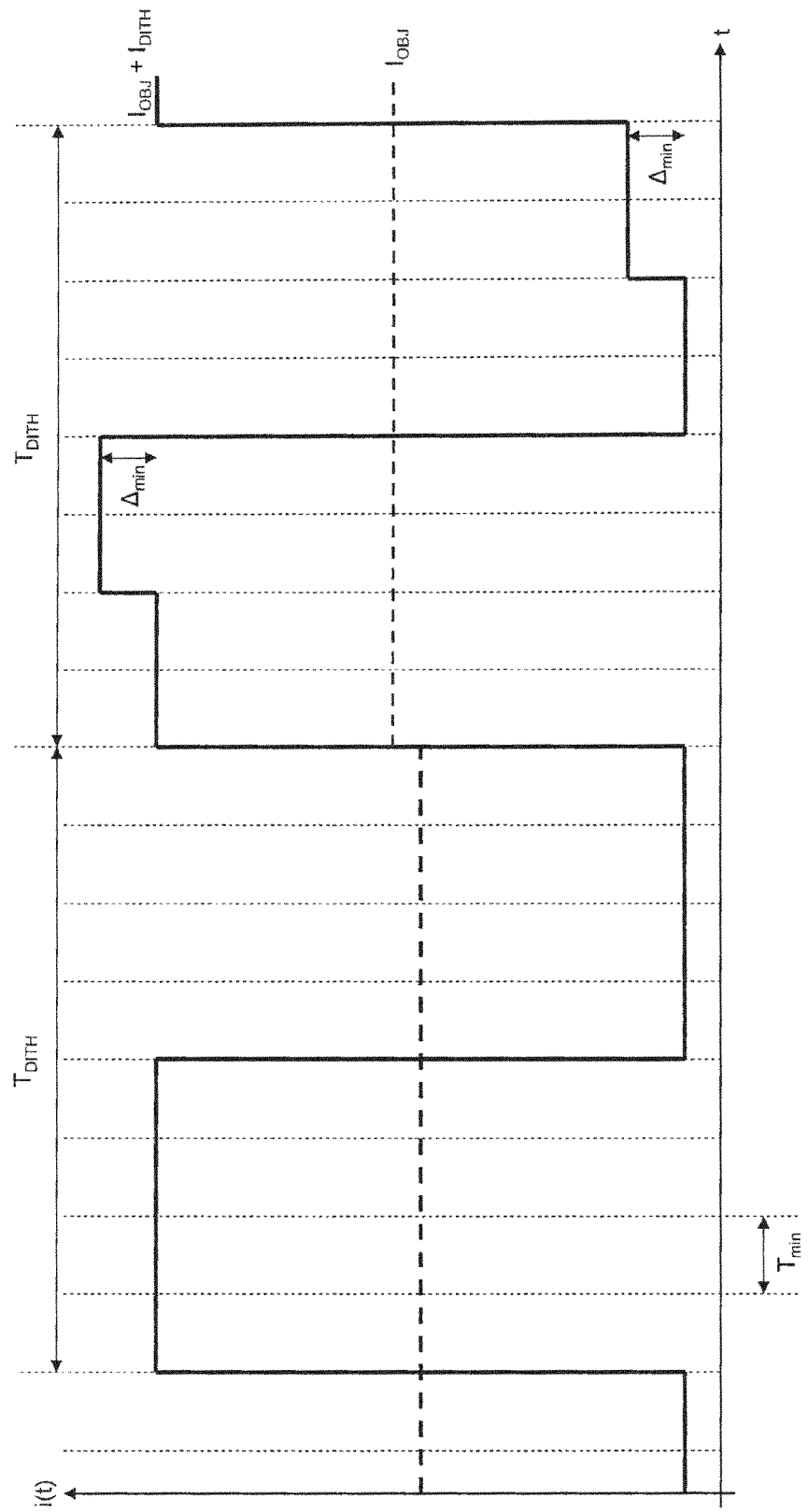

In FIG. 10, the dithering square wave $I_{DITH}$ of the second period differs from the dithering square wave $I_{DITH}$ of the first period in that, during 2/4 of the period $T_{DITH}$, the dithering square wave $I_{DITH}$ of the second period is increased by an amount equal to the minimum quantization interval $\Delta_{min}$; in this manner, the mean value of the target current $I_{OBJ}$ increases by 2/4 of the minimum quantization interval $\Delta_{min}$ between the first period and the second period.

Figure 11:
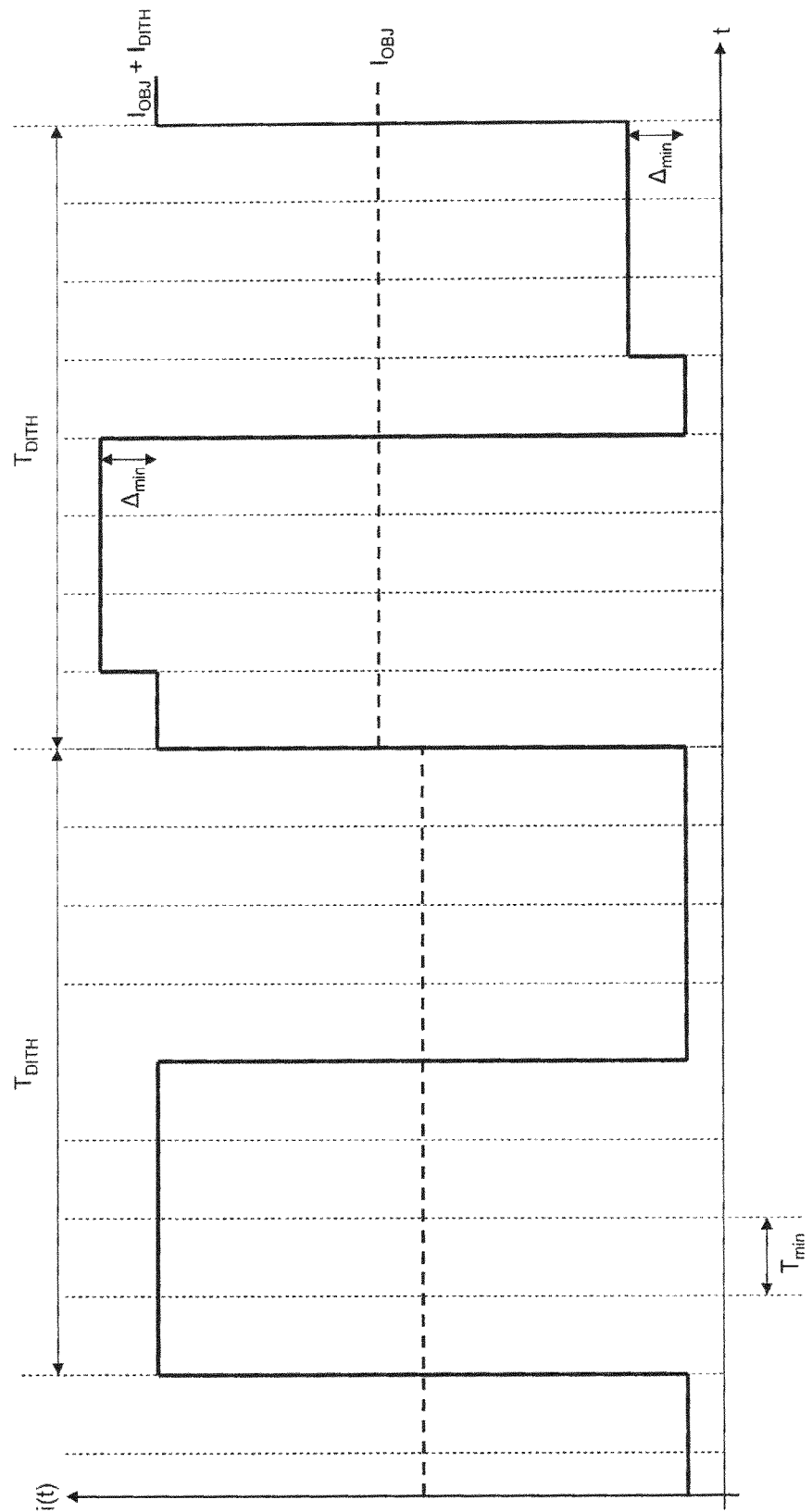

In FIG. 11, the dithering square wave $I_{DITH}$ of the second period differs from the dithering square wave $I_{DITH}$ of the first period in that, during 3/4 of the period $T_{DITH}$, the dithering square wave $I_{DITH}$ of the second period is increased by an amount equal to the minimum quantization interval $\Delta_{min}$; in this manner, the mean value of the target current $I_{OBJ}$ increases by 3/4 of the minimum quantization interval $\Delta_{min}$ between the first period and the second period.

Figure 12:
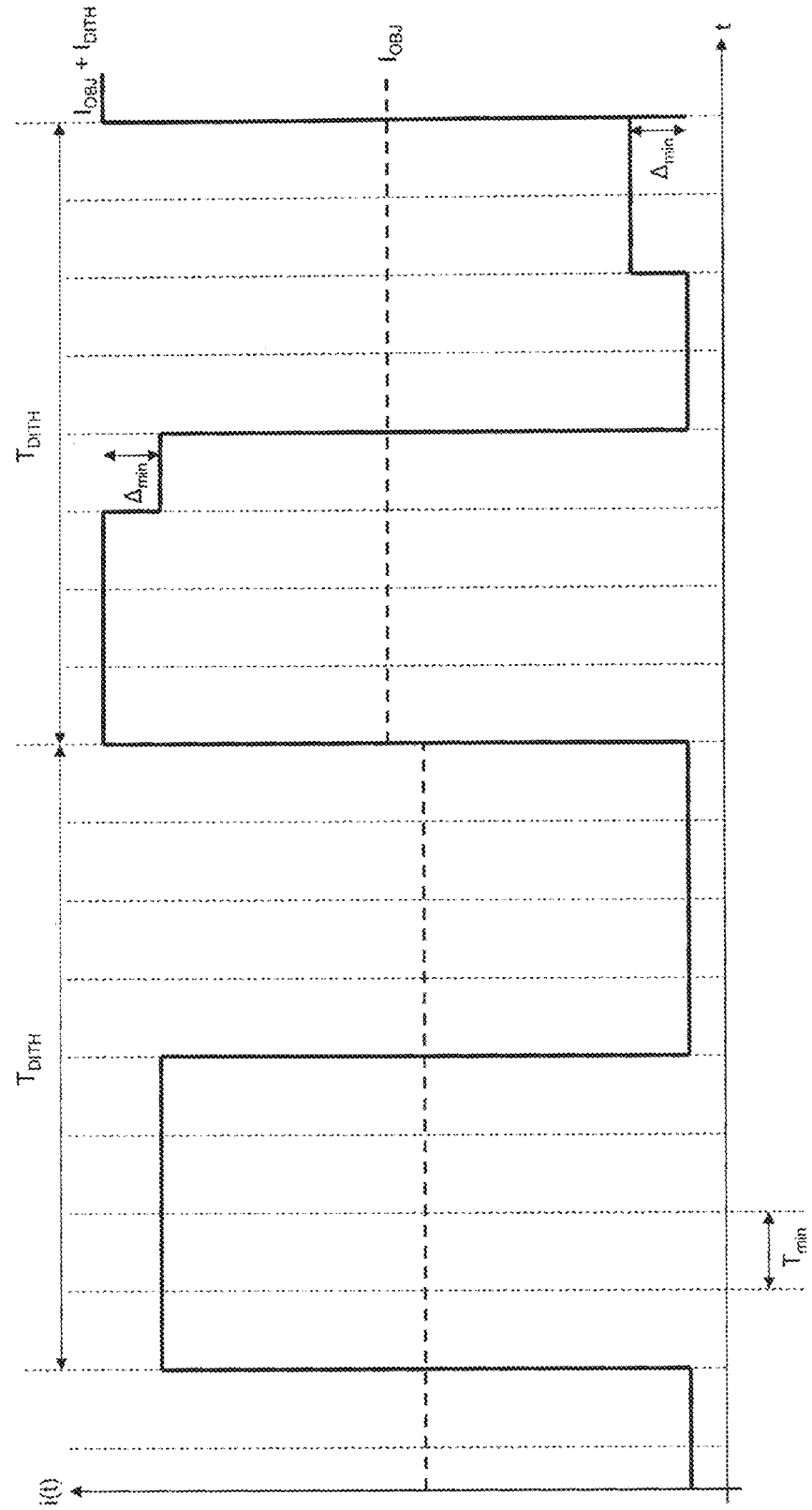

In FIG. 12, the dithering square wave $I_{DITH}$ of the second period differs from the dithering square wave $I_{DITH}$ of the first period in that, during 5/8 of the period $T_{DITH}$, the dithering square wave $I_{DITH}$ of the second period is increased by an amount equal to the minimum quantization interval $\Delta_{min}$; in this manner, the mean value of the target current $I_{OBJ}$ increases by 5/8 of the minimum quantization interval $\Delta_{min}$ between the first period and the second period.

In FIG. 13, the dithering square wave $I_{DITH}$ of the second period differs from the dithering square wave $I_{DITH}$ of the first period in that, during 7/8 of the period $T_{DITH}$, the dithering square wave $I_{DITH}$ of the second period is increased by an amount equal to the minimum quantization interval $\Delta_{min}$; in this manner, the mean value of the target current $I_{OBJ}$ increases by 7/8 of the minimum quantization interval $\Delta_{min}$ between the first period and the second period.

As set forth above, it is apparent that it is possible to obtain a variation of the mean value of the target current $I_{OBJ}$ by an amount equal to a fraction of the minimum quantization interval $\Delta_{min}$, and it is therefore possible to effectively increase the effective resolution on the control of the target current $I_{OBJ}$.

The above-described control method of the position of a solenoid valve 30 using dithering has many advantages.

Firstly, the above-described control method of the position of a solenoid valve 30 using dithering allows to increase the effective resolution of the control of the target current $I_{OBJ}$ which is higher than the "hardware" resolution (i.e. defined by the number of bits of the digital input 39 of the corresponding supporting microcontroller 37). In other words, by means of a moderate complication of the software control, it is possible to increase the effective resolution of the control of the target current $I_{OBJ}$ as compared with the limits defined by the "hardware".

Furthermore, the above-described control method of the position of a solenoid valve 30 using dithering is simple and cost-effective to be implemented, since it does not require the installation of additional physical components and does not involve an expansion of the transmission control unit 12 as it does not require a significant additional processing power.

What is claimed is:

1. Control method to control a position of a solenoid valve using dithering, the control method comprising:
    determining a target current ($I_{OBJ}$), through the solenoid valve, that is expressed in digital form with a given minimum quantization interval ($\Delta_{min}$);
    adding to the target current ($I_{OBJ}$) a dithering square wave ($I_{DITH}$) that has a high frequency of oscillation;
    controlling a voltage (V) applied to the solenoid valve to urge a current (I) through the solenoid follow the target current ($I_{OBJ}$) added to the dithering square wave ($I_{DITH}$);
    jiggling the dithering square wave ($I_{DITH}$) with a frequency that is a sub-multiple of a frequency of variation of the current (I) through the solenoid valve; and
    varying the amplitude of the dithering square wave ($I_{DITH}$) for a fraction of a period ($T_{DITH}$) of the dithering square wave ($I_{DITH}$).

2. Control method according to claim 1, comprising varying the amplitude of the dithering square wave ($I_{DITH}$) by an amount associated with the given minimum quantization interval ($\Delta_{min}$) of the target current ($I_{OBJ}$).

3. Control method according to claim 2, comprising varying the amplitude of the dithering square wave ($I_{DITH}$) by an amount equal to the given minimum quantization interval ($\Delta_{min}$) of the target current ($I_{OBJ}$).

4. Control method according to claim 2, comprising varying the amplitude of the dithering square wave ($I_{DITH}$) to determine a deviation of a mean value of dithering square wave ($I_{DITH}$) compared to a value.

5. Control method according to claim 4, comprising varying the amplitude of the dithering square wave ($I_{DITH}$) to temporarily determine the deviation of a mean value of dithering square wave ($I_{DITH}$) compared to the value.

6. Control method according to claim 4, wherein the value is zero.

7. Control method according to claim 4, comprising varying the amplitude of the dithering square wave ($I_{DITH}$) to provide a corresponding variation of the mean value of the target current ($I_{OBJ}$) by an amount substantially equal to a fraction of the minimum quantization interval ($\Delta_{min}$).

8. Control method according to claim 1, comprising determining the target current ($I_{OBJ}$) and the dithering square wave ($I_{DITH}$) using a primary microcontroller.

9. Control method according to claim 8, comprising transmitting, in digital form, the target current ($I_{OBJ}$) added to the dithering square-wave ($I_{DITH}$) to a support microcontroller for controlling the voltage (V) applied to the solenoid valve to make the current (I) through the solenoid valve follow the target current ($I_{OBJ}$) added to the dithering square wave ($I_{DITH}$).

10. Control method according to claim 1, wherein the solenoid valve is part of a driving hydraulic circuit for actuating an automatic manual transmission.

11. Control method according to claim 10, wherein the solenoid valve is for driving a clutch of the automatic manual transmission.

12. Control method according to claim 1, comprising controlling the voltage (V) applied to the solenoid valve to make the current (I) through the solenoid follow the target current ($I_{OBJ}$) added to the dithering square wave ($I_{DITH}$).

13. Control method according to claim 1, comprising jiggling the dithering square wave ($I_{DITH}$) with the frequency that is a sub-multiple of a maximum frequency of variation of the current (I) through the solenoid valve.

14. Apparatus, comprising an automatic manual transmission for a vehicle, comprising:
    a driving hydraulic circuit having at least one solenoid valve; and
    a control unit of the transmission configured to control the position of the solenoid valve, the control unit comprising:
        a target current circuit configured to determine a target current ($I_{OBJ}$), through the solenoid valve, expressed in digital form with a given minimum quantization interval ($\Delta_{min}$);
        an adding circuit configured to add to the target current ($I_{OBJ}$) a dithering square wave ($I_{DITH}$) that has a high frequency of oscillation;
        a voltage control circuit configured to control a voltage (V) applied to the solenoid valve to make a current (I) through the solenoid follow the target current ($I_{OBJ}$) added to the dithering square wave ($I_{DITH}$);
        a jiggling circuit configured to jiggle the dithering square wave ($I_{DITH}$) with a frequency that is a sub-multiple of the maximum frequency of variation of the current (I) through the solenoid valve; and
        an amplitude varying circuit configured to vary the amplitude of the dithering square wave ($I_{DITH}$) for a fraction of the period ($T_{DITH}$) of the dithering square wave ($I_{DITH}$) and by an amount equal to the minimum quantization interval ($\Delta_{min}$) of the target current ($I_{OBJ}$) to temporarily determine a deviation of a mean value of dithering square wave ($I_{DITH}$) compared to zero and to provide a corresponding variation of the mean value of the target current ($I_{OBJ}$) by an amount equal to a fraction of the minimum quantization interval ($\Delta_{min}$).

15. Apparatus according to claim 14, comprising:
    primary microcontroller to determine the target current ($I_{OBJ}$) and the dithering square wave ($I_{DITH}$); and
    a support microcontroller to receive a digital signal from the primary microcontroller, the digital signal including the target current ($I_{OBJ}$) added to the dithering square-wave ($I_{DITH}$), the support microcontroller configured to control the voltage (V) applied to the solenoid valve to urge the current (I) through the solenoid valve to follow the target current ($I_{OBJ}$) added to the dithering square wave ($I_{DITH}$).

16. Control method to control a position of a solenoid valve using dithering, the control method comprising:
    determining a target current ($I_{OBJ}$) through the solenoid valve that is expressed in digital form with a given minimum quantization interval ($\Delta_{min}$);
    adding to the target current ($I_{OBJ}$) a dithering square wave ($I_{DITH}$) which has a high frequency of oscillation;
    controlling a voltage (V) applied to the solenoid valve to make a current (I) through the solenoid follow the target current ($I_{OBJ}$) added to the dithering square wave ($I_{DITH}$);
    jiggling the dithering square wave ($I_{DITH}$) with a frequency that is a sub-multiple of the maximum frequency of variation of the current (I) through the solenoid valve; and varying the amplitude of the dithering square wave ($I_{DITH}$) for a fraction of the period ($T_{DITH}$) of the dithering square wave ($I_{DITH}$) and by an amount equal to the minimum quantization interval ($\Delta_{min}$) of the target current ($I_{OBJ}$) to temporarily determine a deviation of the mean value of dithering square wave ($I_{DITH}$) compared to zero and therefore get a corresponding variation of the mean value of the target current ($I_{OBJ}$) by an amount equal to a fraction of the minimum quantization interval ($\Delta_{min}$).

17. Control method according to claim 16 comprising:
determining the target current ($I_{OBJ}$) and the dithering square wave ($I_{DITH}$) using a primary microcontroller; and
transmitting in digital form the target current ($I_{OBJ}$) added to the dithering square-wave ($I_{DITH}$) to a support microcontroller that controls the voltage (V) applied to the solenoid valve to make the current (I) through the solenoid valve follow the target current ($I_{OBJ}$) added to the dithering square wave ($I_{DITH}$).

18. Control method according to claim 16, wherein the solenoid valve is part of a driving hydraulic circuit for actuating an automatic manual transmission.

19. Control method according to claim 18, wherein the solenoid valve is for driving a clutch of the automatic manual transmission.

* * * * *